Dec. 16, 1958     J. W. COMBS     2,864,429
CHILD'S AUTOMOBILE SEAT
Filed May 2, 1955     3 Sheets-Sheet 1
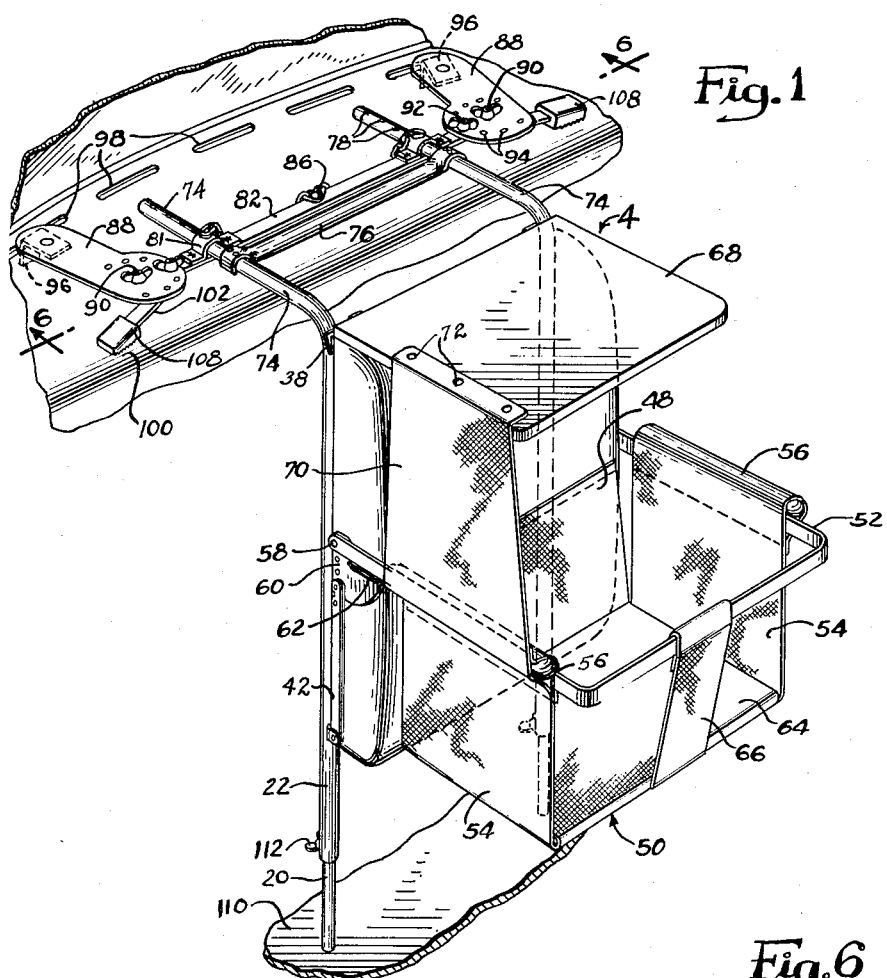
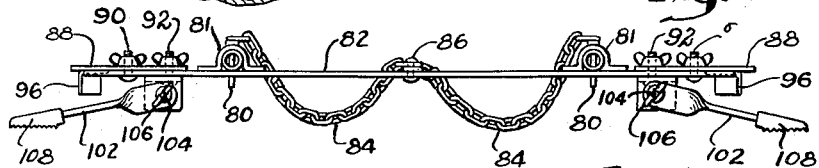
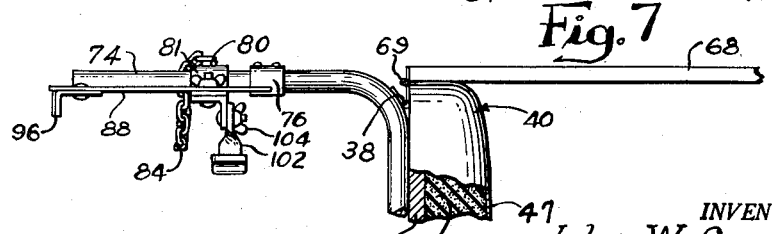
INVENTOR.
John W. Combs
BY
Wayland D Keith
HIS AGENT.

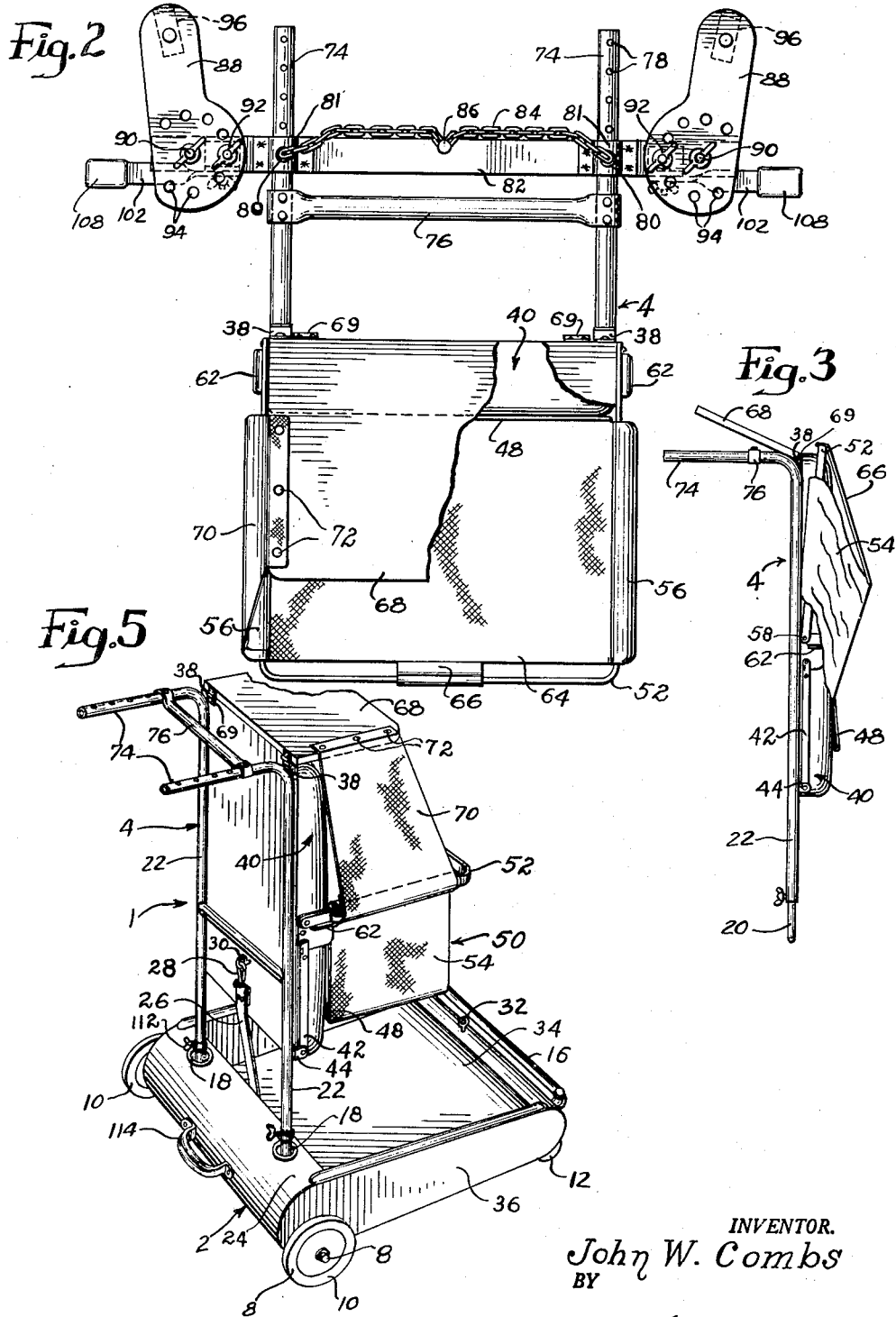

Dec. 16, 1958 J. W. COMBS 2,864,429
CHILD'S AUTOMOBILE SEAT
Filed May 2. 1955 3 Sheets-Sheet 3
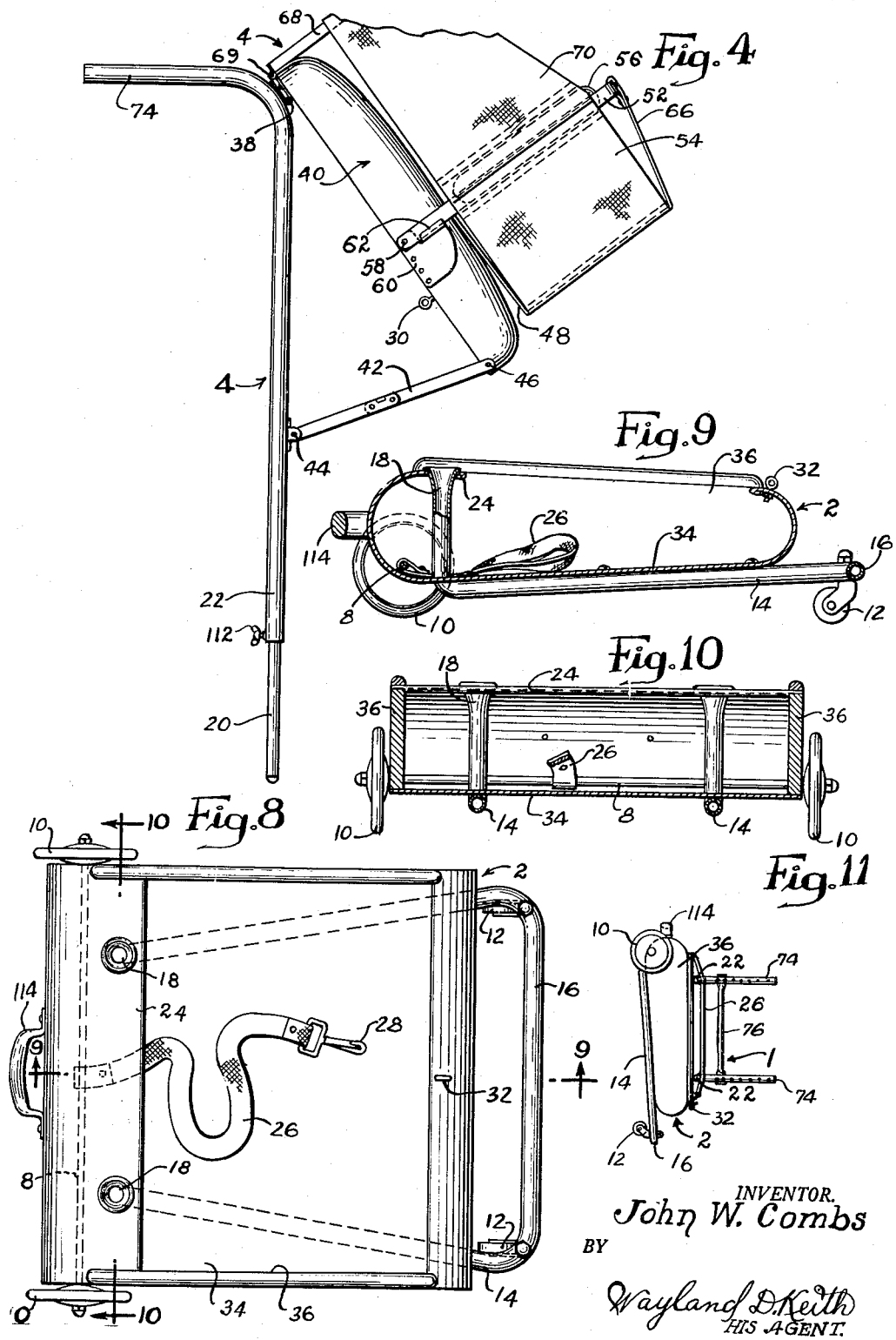
INVENTOR.
John W. Combs
BY
Wayland D. Keith
HIS AGENT.

United States Patent Office 2,864,429
Patented Dec. 16, 1958

2,864,429

CHILD'S AUTOMOBILE SEAT

John W. Combs, Wichita Falls, Tex.

Application May 2, 1955, Serial No. 505,271

4 Claims. (Cl. 155—10)

This invention relates to improvements in a combination child seat for an automobile and a stroller.

Various automobile seats have been proposed heretofore for use by infants and children who are too small to safely occupy a regular seat in a car, but these, for the most part, provided little or no protection or safety for the child, in event the car was brought to a sudden stop, as the child usually faced in the direction of travel of the automobile, therefore, in event of unexpected, sudden stops or accidents, the child had a tendency to be thrown forward, which could result in serious injury or death.

In the present invention, particular emphasis has been placed upon designing a seat which affords maximum safety for the child, by placing the seat against the cowl of the automobile and supporting it both from the floor board of the car and from the cowl, with the child facing in the direction opposite the normal line of travel of the car, and with a substantial thickness of cushioning material being provided intermediate the child and the cowl of the car, so in event of a sudden stop, the cushion will protect the child from injury.

The present invention further provides a stroller attachment, whereby the seat may be readily disconnected from the cowl of the car and fitted onto a stroller cart, so the child or infant may be wheeled from place to place, when not in the car.

An object of this invention is to provide a child's seat for an automobile, which will provide safety for the child upon normal stops of the vehicle, and which may so position the child that it will be under continual surveillance during the operation of the car.

Another object of the invention is to provide a child's seat for an automobile which may collapse when not in use, and which may be readily removed from the car and attached to a stroller or cart for use apart from the car, as desired.

Still another object of the invention is to provide a child's seat which is readily attachable to and adjustable for most conventional automobiles.

Yet another object of the invention is to provide a child's seat for an automobile wherein the steering wheel and other mechanism of the car is shielded from the child by means of a curtain.

A still further object of the invention is to provide for an automobile a combination child's bed and seat.

A further object of the invention is to provide a combination automobile seat for a child and a stroller with a package receiving cart attached thereto.

Still another object of this invention is to provide a stroller frame, the frame and bumper of which are integrally formed.

Another object of the invention is to provide an automobile seat for a child, which seat will telescope into a stroller cart for storage or for transportation of the child from place to place.

With these objects in mind, and others which will manifest themselves as the description proceeds, reference is to be had to the accompanying drawings in which like reference characters designate like parts in the several views thereof, in which:

Fig. 1 is a perspective view of the combination child's seat and stroller, being utilized within an automobile as a child's seat, and showing a portion of the automobile cowl with the seat attached thereto, and showing the top, side and front portions of the seat;

Fig. 2 is a top plan view of the child's seat removed from the car, with parts broken away to show the details of construction;

Fig. 3 is a side elevational view of the child's seat removed from the automobile, and showing the device in collapsed condition;

Fig. 4 is a side elevational view of the child's seat in a semi-reclining position, in which position the seat may either be mounted in the automobile or on the stroller cart;

Fig. 5 is a perspective view showing the seat attachably connected to the stroller cart, which view is taken from the top, rear and a side;

Fig. 6 is a sectional view taken on the line 6—6 of Fig. 1, looking in the direction indicated by the arrows;

Fig. 7 is a fragmentary elevational view of the top portion of the seat, showing the connecting braces, and sunshades, and also showing portions of the crash pad broken away and in section, to show the details of construction;

Fig. 8 is a top plan view of the stroller cart, with the seat removed therefrom;

Fig. 9 is a sectional view taken on the line 9—9 of Fig. 8, looking in the direction indicated by the arrows;

Fig. 10 is a sectional view taken on the line 10—10 of Fig. 8, looking in the direction indicated by the arrows; and Fig. 11 is an elevational view, on a reduced scale, showing the seat telescoped into the stroller cart.

With more detailed reference to the drawing, the numeral 1 designates generally a combination child's seat for an automobile and a stroller, the seat being in combination with a stroller as will be seen in Fig. 5. The numeral 2 designates generally a stroller cart which may be attached to the seat generally designated by the numeral 4. The seat 4 is shown attached to the stroller cart 2 by means of a strap 26 and a hook 28. The stroller cart 2 has a rear axle 8 on which wheels 10 are journaled, as will best be seen in Figs. 5, 8, 9, and 10.

The stroller cart 2 has a frame 14 formed of tubular members. Caster wheels 12 are mounted on the forward end of the frame 14, which frame also serves as a bumper, as indicated at 16, in Fig. 8. The rear end of the frame 14 has the tubular members up-turned to form sockets 18, which sockets 18 telescopically receive the respective extension members 20 of standards 22 of the seat 4. The tubular frame members 14 of the cart extend upward through the covering 24, of the stroller cart 2, and have their upper ends belled and rolled over the covering material so as to firmly brace the cart, and at the same time position the sockets 18 in such manner as to guide extension members 20 thereinto, without the necessity of having to hold the parts in exact alignment when assembling the cart and the seat into a stroller.

The strap 26 is looped, at its lower end, around the axle 8 of the stroller cart, which strap has a hook 28 at the upper end thereof for engagement with an eye 30 secured to the back of the stroller seat 4, as will best be seen in Figs. 4 and 5. An eye 32 is positioned on the forward end of the stroller cart 2 so as to receive the hook 28 to enable the seat 4 to be held in telescoped relation to the stroller cart 2, while being carried from place to place. The stroller cart 2 has a bottom 34 and ends 36 which form a utility container, while the device is being used as a stroller.

A hinge 38 is secured to the upper end of each of the standards 22 and to the upper end of a crash pad member, designated at 40, so as to enable the crash pad member to be moved outward into an angular position, as indicated in Fig. 4, and to be locked in this position by means of folding brace bars 42, which brace bars are each hingeably connected at one end thereof to a bracket 44 on each of the standards 22, and at the other end thereof to the respective pivots 46, each of which pivots is secured to the lower end of crash pad member 40.

The crash pad member 40 has a rigid backing member 43 and a resilient cushion member 45, such as rubberized hair, sponge rubber, or other highly resilient padding, which is adapted to cushion the impact and shock of sudden stops. A covering 47, such as fabric, plastic or the like, encloses the cushioning material 45 and is secured to the backing 43.

A back portion 48 of a seat 50 is secured to the covering 47, by stitching, or other suitable means.

The seat 50 has a frame 52 hinged to the member 43, at arm level above the seat, over which fabric side members 54 are secured, as will best been seen in Fig. 1. The upper portion of the sides of frame 52 are padded, as indicated at 56 to form arm rests. The ends of frame 52 adjacent to the cushion member 40 are pivotally secured by pivot pins 58 to a bracket 60, each of which brackets 60 has an out-turned lip 62 to sustain the frame 52 in outstanding position, when the frame is extended, but which will permit the frame to telescope over the cushion member 40 when the frame 52 is in raised position, as shown in Fig. 3. The seat 50 has a bottom 64 therein to which a strap 66 is attached, which strap extends medially upward to the forward side of frame 52, as will best be seen in Fig. 1.

A sunshade or top member 68 is hingeably secured to the upper end of cushion member 40 and extends outward to form a cover when desired, or to hinge rearward on hinge 69, as shown in Fig. 3, to enable the seat 50 to be collapsed to conserve space, or for transportation, as will be seen in Figs. 3 and 11, respectively. The sunshade 68 and a protector curtain 70 are provided on one or both sides which are detachably secured to top member 68 by snap fasteners 72. A side curtain 70 may be provided for either or both sides of the seat, and presents a safety barrier intermediate the child occupying the seat, and the mechanism of the car, such as the gear shift lever, steering wheel, or the like.

Due to the fact that modern motor cars are varied in construction, the present seat must be adaptable and adjustable so as to be fitted into practically any make or model car. Therefore, the out-turned portions or end members 74 of the standards 22 extend outward from the top of the cushion member 40 so as to form a pair of handles, to be used as handles when the device is being used as a stroller, but, when used as a seat in the car, form a pair of mounting bars to mount the seat within the car. These mounting bars 74 have a cross brace 76 therebetween to hold the mounting bars in rigid spaced relation. Vertical holes 78 are formed through the out-turned portions of the respective bars 74 and which holes are adapted to receive pins 80 therethrough and through apertured loops 81, which loops are mounted on apertured mounting bracket 82. The apertures of the respective loops 81 are adapted to be in axial alignment with the respective apertures in the mounting brackets 82. The pins 80 are secured to the mounting bracket 82 by means of chains 84 which chains are riveted thereto as shown at 86.

The bracket 82 has an arm 88 at each end thereof, each of which arms is pivotally mounted about a screw-threaded bolt 90 so as to enable the arms 88 to be swung about the respective pivots 90 to the proper degree of angularity, whereupon a second screw-threaded bolt 92 is positioned through a hole that is formed within each end portion of the bracket 82 and one of the holes 94 within the respective arms 88.

A down-turned lug 96 is pivotally mounted on the outer end of each of the arms 88 to engage louvers 98 which are formed in the top of the cowl 100 of the car in which the seat is to be positioned. In this manner the arms 88 and lugs 96 can be swung into such position as to engage ventilation louvers 98 of practically any model or make of automobile. A supporting leg 102 is pivotally mounted at the respective ends of the bracket 82 by means of pivot bolts 104, and each leg is secured in position by means of a wing nut 106. It is preferable to have resilient or serrated rubber feet 108 on the outer ends of the legs 102, so as to engage the cowl and hold the out-turned bars 74 at the proper spaced distance above the cowl 100.

It is to be pointed out, that by this arrangement the seat can be adjusted toward or away from the cowl by the use of pins 80 engaging in holes 78, and the standard 22 is supported by support extensions 20 engaging the floor 110 of the car. These support extensions may be locked in place by means of wing screws 112, as will be seen in Fig. 1.

A handle 114 is provided on the rear end of the stroller cart 2, to facilitate the handling of the stroller cart, or for carrying combination cart and seat when the two are telescoped together in the manner indicated in Fig. 11.

It is to be pointed out that when the child's seat is used within the automobile, the child is riding with its back flat against the crash pad member 40, and should a crash occur the impact will be distributed the length of the child's body, which will be cushioned by the resilient material of the crash pad, thereby minimizing the likelihood of injury to the child, by its being thrown against hard, sharp portions of the car or against objects in the car. Also, an adult riding in the car will have an opportunity to protect the child or to hold it, which would not be possible if the adult had to turn from one position to another before reaching the child. Another feature of safety is that the length of the crash pad protects the head of the child against violent impact, and the head is one of the most vulnerable portions of the child's body, when a crash occurs. Even when in a semi-reclining position, as shown in Fig. 4, the component of force at forty five degrees or less inclination of the seat, would still not have material tendency to move the child's body upward along the incline.

As pointed out, the versatility of use of the seat in the car and as a stroller, saves the necessity of having two or more pieces of equipment, that is, both a car seat and a stroller, which is desirable both from the standpoint of expense and of storage space, as well as for convenience of the adults in caring for the child and for the protection and safety of the child, both while motoring and while shopping or other activity during which a small child must accompany an adult.

The safety features of the seat are effective for protecting the child whether the seat is positioned in a car or when it is used as a stroller, but due to the large number of automobile accidents in which small children are involved, it is doubly important for use while motoring, as the child is in full view of an adult at all times when riding in the seat as provided herein, is within easy reach of the adult, and is protected from sudden impact with portions of the car, should a crash occur, furthermore, the construction and positioning of the seat within the car, lessens the chance of the child being thrown from the seat through the wind-shield of the car or against some portion of the car with enough force to result in serious injury.

While the invention has been illustrated and described in some detail so to the embodiment thereof, it is to be understood that changes may be made in the minor details of construction and adaptations made to different installations without departing from the spirit of the invention or the scope of the appended claims.

Having thus described the invention, what is claimed is:

1. A child's seat for an automobile, which seat is adapted to be attachably connected to the cowl of an automobile, said seat comprising a pair of spaced apart, upright members each having the upper end thereof out-turned and forming a frame, the respective lower ends of said upright members being adapted to rest on the floor of said automobile, an elongated bar extending between the out-turned ends of said members, means adjustably securing said elongated bar to said respective out-turned portions of said members, a leg pivotally mounted near each end of said bar and extending downwardly, which legs pivot about horizontal and vertical axes, an arm pivotally secured to said bar near each end thereof for pivoting about an upright axis, means securing each arm in fixed, adjusted relation to said elongated bar, an L-shaped lug pivotally mounted on each arm near the outer end thereof, which lugs pivot about upright axes, a rigid, relatively flat member extending between said upright members and being hingeably connected thereto near the upper ends thereof, a relatively thick cushion fitted on said rigid member and facing in the opposite direction from said outwardly extending ends of said upright frame members, and a seat member secured to said cushion near the lower edge thereof and extending outwardly therefrom to receive a child therein.

2. A device for attaching a child's seat member to the cowl of an automobile, comprising a bracket extending longitudinally of said cowl, a pair of spaced apart, upstanding apertured loops mounted on said bracket, which loops are adapted to receive therethrough out-turned end members of said seat member, a downwardly extending leg pivotally attached to said bracket near each end thereof, each of which legs is adapted to pivot in horizontal and vertical planes, an arm pivotally mounted on each end of said bracket, means for securing said arms in a relatively angular position with respect to said bracket, a down-turned lug pivotally mounted on each arm near the outer end thereof, the axis of the pivot mountings being substantially upright.

3. A device as set forth in claim 2, wherein said outwardly extending arms each has a plurality of apertures formed therein and concentrically arranged with respect to the pivot point thereof, and wherein the means provided for securing each of said arms in fixed relation with respect to said bracket, is a bolt means, which bolt means passes through said bracket and one of said apertures in each of said arms.

4. The device as set forth in claim 2, wherein said downwardly extending legs each has a resilient foot fitted on the lower end thereof.

References Cited in the file of this patent

UNITED STATES PATENTS

| | | |
|---|---|---|
| 1,357,110 | Niemi | Oct. 26, 1920 |
| 1,664,958 | Zeiser | Apr. 3, 1928 |
| 2,208,392 | Sadler | July 16, 1940 |
| 2,296,415 | Baker et al. | Sept. 22, 1942 |
| 2,508,822 | Goldberg | May 23, 1950 |
| 2,522,205 | Anderson | Sept. 12, 1950 |
| 2,546,790 | Shook | May 27, 1951 |
| 2,735,113 | Turner | Feb. 21, 1956 |

FOREIGN PATENTS

| | | |
|---|---|---|
| 876,586 | Germany | May 15, 1953 |